United States Patent
Cho et al.

(10) Patent No.: US 7,486,931 B2
(45) Date of Patent: Feb. 3, 2009

(54) SYSTEM AND METHOD FOR RESELECTING ANTENNAS IN A CELLULAR MOBILE COMMUNICATION SYSTEM USING MULTIPLE ANTENNAS

(75) Inventors: Sung-Hyun Cho, Seoul (KR); Robert W. Heath, Austin, TX (US)

(73) Assignees: Samsung Electronics Co., Ltd. (KR); Board of Regents, The University of Texas System, Austin, TX (US)

( * ) Notice: Subject to any disclaimer, the term of this patent is extended or adjusted under 35 U.S.C. 154(b) by 474 days.

(21) Appl. No.: 11/105,984

(22) Filed: Apr. 14, 2005

(65) Prior Publication Data

US 2005/0239510 A1 Oct. 27, 2005

Related U.S. Application Data

(60) Provisional application No. 60/561,891, filed on Apr. 14, 2004.

(30) Foreign Application Priority Data

Jan. 7, 2005 (KR) .................. 10-2005-0001674

(51) Int. Cl.
*H04B 1/02* (2006.01)
*H04B 7/02* (2006.01)
*H04M 1/00* (2006.01)

(52) U.S. Cl. .................. 455/39; 455/67.11; 455/101; 455/277.2; 455/562.1

(58) Field of Classification Search .................. 455/101, 455/63.4, 562.1, 575.7, 272, 275, 277.1–279.1
See application file for complete search history.

(56) References Cited

U.S. PATENT DOCUMENTS

| 5,138,327 | A * | 8/1992 | Chang et al. ................ 342/367 |
| 5,689,502 | A * | 11/1997 | Scott ......................... 370/281 |
| 6,385,464 | B1 * | 5/2002 | Narita et al. ................ 455/561 |
| 7,069,051 | B1 * | 6/2006 | Katz ......................... 455/562.1 |
| 2003/0162519 | A1 * | 8/2003 | Smith et al. ............... 455/277.1 |
| 2004/0127257 | A1 * | 7/2004 | Raghothaman et al. ..... 455/560 |
| 2004/0266375 | A1 * | 12/2004 | Li et al. ..................... 455/140 |
| 2005/0085195 | A1 * | 4/2005 | Tong et al. ................. 455/101 |
| 2005/0200524 | A1 * | 9/2005 | Grandhi et al. ............. 342/374 |

* cited by examiner

*Primary Examiner*—Simon D Nguyen
(74) *Attorney, Agent, or Firm*—The Farrell Law Firm, PC

(57) ABSTRACT

A cellular mobile communication system using multiple antennas reselects a plurality of transmission antennas of base stations connected to a mobile station. The system includes measuring a channel quality parameter used for estimation of channel performance, determining whether to reselect the transmission antennas using the measured channel quality parameter, reselecting transmission antennas of the base stations connected to the mobile station, and connecting the reselected transmission antennas to the base station.

14 Claims, 8 Drawing Sheets

SYSTEM AND METHOD FOR RESELECTING ANTENNAS IN A CELLULAR MOBILE COMMUNICATION SYSTEM USING MULTIPLE ANTENNAS

PRIORITY

This application claims priority under 35 U.S.C. § 119 to an application entitled "Partial Handoff in MIMO-OFDM Cellular Systems" filed in the United States patent and Trademark Office on Apr. 14, 2004 and assigned Ser. No. 60/561,891, and an application entitled "System and Method for Reselecting Antennas in a Cellular Mobile Communication System Using Multiple Antennas" filed in the Korean Intellectual Property Office on Jan. 7, 2005 and assigned Ser. No. 2005-1674, the contents of both of which are incorporated herein by reference.

BACKGROUND OF THE INVENTION

1. Field of the Invention

The present invention relates generally to a technology for reselecting an antenna in a cellular mobile communication system, and in particular, to a technology for reselecting a plurality of antennas of base stations connected to a mobile station as the mobile station shifts from one place to another.

2. Description of the Related Art

The conventional mobile communication system provides a voice-oriented service, and chiefly depends on channel coding in order to overcome deterioration in channel quality. However, due to an increase in demand for high-quality multimedia service that enables users to communicate with anyone, anytime, anywhere, the conventional voice service is evolving into a data service and there is a demand for a next generation radio transmission technology for transmitting the increased amount of data at a higher data rate and at a lower error rate. In particular, importance of high-speed data transmission in a forward link having the greater amount of required data is ever increasing.

A mobile communication environment deteriorates the reliability of the signals due to fading, shading effect, propagation attenuation, noise, and interference. A fading phenomenon due to multiple paths brings about significant signal distortion caused by the sum of signals having different phases and sizes, which are received through different paths. The fading effect is one of the difficulties that should be overcome in order to achieve a high-speed data communication, and extensive researches is being conducted to overcome the wireless channel characteristics and utilize the features. As a result, a Multiple Input Multiple Output (MIMO) technology using a plurality of transmission and reception antennas has been proposed.

In a cellular mobile communication system using the multiple antennas, unlike in the conventional cellular mobile communication system, a mobile station and a base station, both of which use a plurality of antennas, can exchange data with each other at a higher speed without increasing a bandwidth of the system.

Even in the cellular mobile communication system using multiple antennas, like in the conventional cellular mobile communication system in which a mobile station uses a single antenna, performance of a channel formed between a mobile station and a base station varies due to the movement of the mobile station, and a need for forming a new channel to another antenna occurs as the mobile station moves from one cell to another, or if channel quality is to be adjusted. The cellular mobile communication system using multiple antennas, as a base station has a plurality of antennas even in a single cell, should occasionally reselect antennas according to time-varying channel performance. For example, even when a mobile station moves between sectors in a cell divided by the plurality of antennas of the base station, an antenna should be reselected for the same base station.

In addition, when a mobile station moves from a current cell (serving cell) to another cell (target cell), the mobile station in an overlapping region between the cells may connect with both an antenna of a serving base station and an antenna of a target base station. In this case, it is difficult to reconfigure a channel with the conventional handoff scheme.

SUMMARY OF THE INVENTION

The present invention provides a system and method for reselecting a plurality of antennas of base stations connected to a mobile station according to channel performance in a cellular mobile communication system using multiple antennas.

The present invention provides a system and method in which a mobile station is simultaneously connected to base stations of neighbor cells using a plurality of antennas when the mobile station moves between cells in a cellular mobile communication system using multiple antennas.

The present invention provides a system and method for reselecting a plurality of antennas of base stations connected to a mobile station during a handoff in a cellular mobile communication system using multiple antennas.

The present invention provides a system and method in which a mobile station is simultaneously connected to neighbor base stations using a plurality of antennas in a region where a plurality of cells overlap each other during a handoff in a cellular mobile communication system using multiple antennas.

According to one aspect of the present invention, there is provided a method for reselecting an antenna for a data channel by a mobile station in a cellular mobile communication system including the mobile station having at least two antennas, a home base station having a plurality of antennas, at least one of which is used to form the data channel to the mobile station, and at least one neighbor base station for the home base station, the method including the steps of determining whether to reselect antennas according to channel qualities individually measured for first antennas of the home base station and second antennas of the neighbor base station; and selecting at least two antennas from among the first antennas and the second antennas when it is necessary to reselect the antennas.

According to another aspect of the present invention, there is provided a method for reselecting an antenna for a mobile station by a home base station used to form a data channel to the mobile station having at least two antennas in a cellular mobile communication system using multiple antennas, the method including the steps of receiving from the mobile station channel qualities individually measured for first antennas of the home base station and second antennas of a neighbor base station for the home base station; determining whether to reselect antennas for the mobile station according to the channel qualities; and selecting at least two antennas from among the first antennas and the second antennas when it is necessary to reselect the antennas.

According to further another aspect of the present invention, there is provided a system for reselecting an antenna for a data channel by a mobile station in a cellular mobile communication system including the mobile station having at least two antennas, a home base station having a plurality of antennas, at least one of which is used to form the data channel to the mobile station, and at least one neighbor base station for the home base station, the system including the mobile station for determining whether to reselect antennas based on channel qualities individually measured for first antennas of the home base station and second antennas of the neighbor base station, selecting at least two antennas from among the first antennas and the second antennas based on the measured channel qualities when it is necessary to reselect the antennas, and transmitting information on the selected at least two antennas to the home base station; and the home base station for receiving information on the measured channel qualities and transmitting a command for selection of at least the two antennas to the mobile station according to the received information.

According to further another aspect of the present invention, there is provided a system for reselecting an antenna for a mobile station by a home base station used to form a data channel to the mobile station including at least two antennas in a cellular mobile communication system using multiple antennas, the system including the mobile station for measuring channel qualities for first antennas of the home base station and second antennas of a neighbor base station for the home base station, and transmitting the measured channel qualities; and the home base station for determining whether to reselect antennas for the mobile station based on the measured channel qualities, and selecting at least two antennas from among the first antennas and the second antennas according to the measured channel qualities when it is necessary to reselect the antennas.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

The present invention reselects a plurality of antennas of base stations connected to a mobile station in a cellular mobile communication system using multiple antennas. For convenience of description, it will be assumed herein that a base station serves as a transmission side and a mobile station serves as a reception side, that a forward link having a greater amount of required data is taken into consideration, and thus the antennas of the base station are referred to as transmission antennas, and antennas of the mobile station are referred to as reception antennas. However, it should be noted that the present invention is not limited to the forward link.

Figure 1:
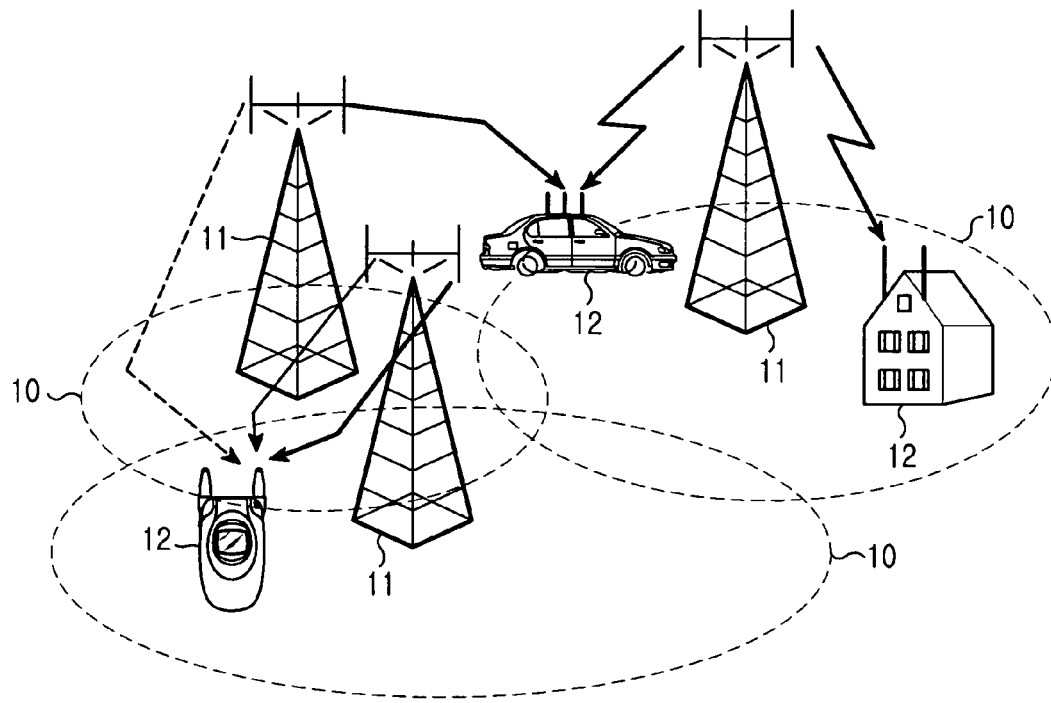
FIG. 1 is a diagram illustrating a cellular mobile communication system using multiple antennas to which the present invention is applied.

As illustrated in FIG. 1 in a cellular mobile communication system using multiple antennas to which the present invention is applied includes mobile stations (MSs) 12 and base stations (BSs) 11 each of which include multiple antennas. A channel of the cellular mobile communication system using multiple antennas is formed with a combination of a plurality of reception antennas of the mobile stations 12 and a plurality of transmission antennas of the base stations 11. In particular, as the mobile stations 12 include a plurality of reception antennas, a plurality of reception antennas included in the same mobile station 12 can be simultaneously connected to transmission antennas of different base stations 11.

It is general provision that the mobile stations 12 continuously shift from one place to another, channels between the plurality of antennas of the mobile stations 12 and the base stations 11 should be changed upon occasions for the best channel performance. In particular, the cellular mobile communication system using multiple antennas, as a base station has a plurality of transmission antennas even in a single cell, should occasionally reselect transmission antennas according to time-varying channel performance. For example, even when a mobile station moves between sectors in a cell divided by the plurality of transmission antennas of the base station, transmission antennas should be reselected for the same base station. In addition, when a mobile station moves from a current cell (serving cell) to another cell (target cell), the mobile station in an overlapping region (also known as "handoff region") between the cells can connect with both a plurality of transmission antennas of a serving base station managing the serving cell and a plurality of transmission antennas of a target base station managing the target cell. Of course, even in a non-handoff region, depending upon channel performance, all of the reception antennas of a mobile station may be connected to the transmission antennas of the serving base station managing the serving cell or to the transmission antennas of the target base station managing the target cell. The present invention can be applied to all of the foregoing cases.

The present invention can be roughly implemented with two methods. In one method, a mobile station reselects transmission antennas of base stations connected thereto. In another method, a base station reselects transmission antennas of base stations connected to a mobile station.

Herein, a description of the present invention will be separately made for a first embodiment in which a mobile station reselects transmission antennas of base stations connected thereto, and a second embodiment in which a base station reselects transmission antennas of base stations connected to a mobile station.

In a cellular mobile communication system using multiple antennas, in order to reselect a plurality of transmission antennas of base stations connected to a mobile station according to the present invention, a process of measuring a channel quality parameter based on which channel performance is estimated, and a process of determining whether to reselect transmission antennas using the estimated channel quality parameter should be initially performed. After performing the process of measuring a channel quality parameter and determining whether to reselect transmission antennas, the system performs a main process of reselecting transmission antennas of base stations connected to a mobile station.

First Embodiment

A first embodiment of the present invention provides a system and method in which a mobile station reselects transmission antennas of base stations connected thereto.

Figure 2:
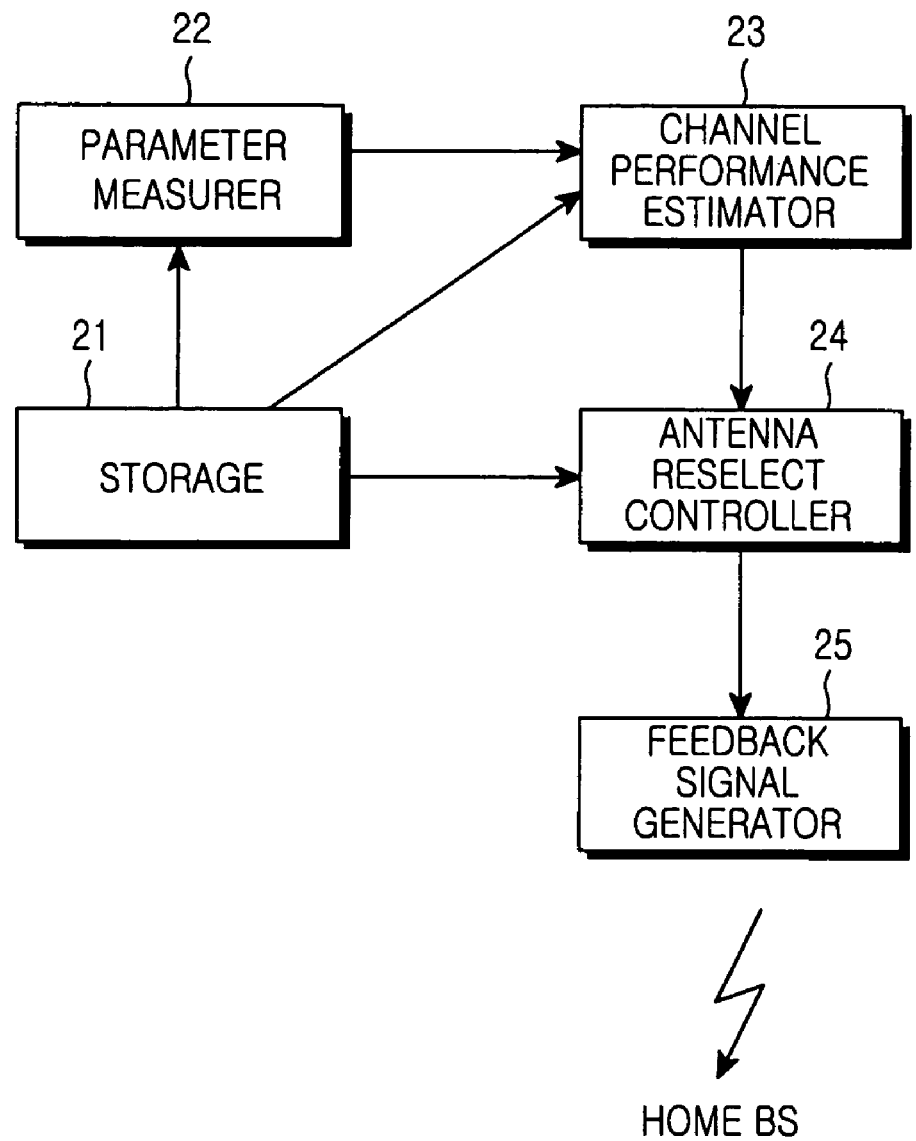
FIG. 2 is a diagram illustrating a structure of a mobile station according to a first embodiment of the present invention.

With reference to FIG. 2 a description will be made of a structure of a mobile station according to the first embodiment of the present invention.

Referring to FIG. 2, a mobile station includes a storage 21, a parameter measurer 22, a channel performance estimator 23, an antenna reselect controller 24, and a feedback signal generator 25.

The storage 21 stores a candidate list of neighbor base stations neighboring a base station connected to the mobile station in the current position (hereinafter referred to as a "home base station"). The candidate list of the neighbor base stations includes identifications (IDs) of the base stations, the number of transmission antennas provided by a corresponding base station, and information related to the transmission antennas which can be reselected according to the present invention. The stored information can be derived from a memory (not shown) of the mobile station or can be received from base stations through control signals (for example, beacon signals).

Further, the candidate list of the neighbor base stations includes the information related to the home base station for the following reason. As the base stations include a plurality of transmission antennas, even though the particular transmission antennas have poor channel performance, the other transmission antennas having good channel performance can be connected to reception antennas of a mobile station, thereby forming high-performance channels. In addition, even though a mobile station is located in a handoff region, all of the transmission antennas selected in a transmission antenna reselecting process can be either transmission antennas of the home base station or transmission antennas of the neighbor base stations according to channel performance.

The parameter measurer 22 measures a channel quality parameter, an index based on the performance of the channels connected to the home base station and the neighbor base stations. It is preferable to periodically perform the measurement on the channel quality parameter. Alternatively, the measurement on the channel quality parameter can be performed at specific occasions. For example, the measured channel quality parameter includes noise power, signal power, correlation feature, Received Signal Strength Indicator (RSSI), Carrier-to-Interference ratio (C/I), Signal-to-Noise Ratio (SNR), and Signal-to-Interference Noise Ratio (SINR).

The channel performance estimator 23 generates information based on which performance of respective channels can be estimated, using the channel quality parameter measured by the parameter measurer 22.

The antenna reselect controller 24 has a threshold value with which it can determined whether to reselect transmission antennas, for the channel performance estimation information generated by the channel performance estimator 23. Based on the threshold value, the antenna reselect controller 24 determines whether to reselect transmission antennas based on whether the channel performance estimation information is greater or less than the threshold value. If it is determined that the transmission antennas should be reselected, the antenna reselect controller 24 provides to the home base station the feedback signal generator 25 with the measured channel quality parameter value to be transmitted.

If a transmission antenna reselect command is received from the home base station, the antenna reselect controller 24 reselects the transmission antennas reconnected to the reception antennas of the mobile station by consulting the candidate list of the neighbor base stations, stored in the storage 21. The antenna reselect controller 24 transmits the information related to the reselected transmission antennas and the information on the neighbor base stations including the reselected transmission antennas to the home base station through the feedback signal generator 25.

In the first embodiment of the present invention, the transmission antenna reselection is performed by the antenna reselect controller 24 of the mobile station, and its preceding process of determining whether to reselect transmission antennas depending on channel performance estimation information is also performed by the antenna reselect controller 24.

The feedback signal generator 25 quantizes the measured channel quality parameter value provided from the antenna reselect controller 24, information on the reselected transmission antennas, and information on the neighbor base stations including the reselected transmission antennas, and transmits the quantization results to the home base station.

A detailed description will now be made of a method in which the parameter measurer 22 measures a channel quality parameter, and a method in which the antenna reselect controller 24 determines whether to reselect transmission antennas, and reselects the transmission antennas according to the determination result.

First, the method in which the parameter measurer 22 measures a channel quality parameter will be described. In the following description, it will be assumed that the parameter measurer 22 measures a channel quality parameter in a MIMO Orthogonal Frequency Division Multiplexing (MIMO-OFDM) cellular communication system. However, the channel quality parameter measurement method according to the present invention is not restricted to the MIMO-OFDM cellular communication system, and can include all of the channel quality parameter measurement methods for the cellular mobile communication systems using multiple antennas.

Generally, an input/output relation in a time domain in a MIMO-OFDM communication system is defined as Equation (1).

$$y(n, p) = \sum_{l=0}^{L} h(l, p)x(n - l, p) + v(n, p) \quad (1)$$

where $\{h(l,p)\}$ (where $l=0, \ldots, L$) denotes samples of a MIMO multipath propagation channel at a time constant 'n' for an OFDM symbol 'p', y(n,p) denotes a vector sampled at an $n^{th}$ sample for the OFDM symbol 'p', and v(n,p) denotes a term for noise and interference for a sample 'n' and an OFDM symbol 'p'.

Equation (1) can be expressed as Equation (2) in a frequency domain.

$$Y(f,p) = H(f,p)X(f,p) + V(f,p) \quad (2)$$

where 'f' denotes a tone, i.e., a subcarrier.

In the MIMO-OFDM communication system, noise power is measured as follows. In the time domain where it is assumed that no signal is transmitted (x(n,p)=0 for all n and a given OFDM symbol p), noise power is defined as Equation (3).

$$\sigma_v^2 \cong \frac{1}{NM_t} \sum_n |y(n, p)|^2 \quad (3)$$

where $\sigma_v$ is the noise power, the summation is performed over N samples and $M_t$ is the number of transmission antennas.

Equation (3) can be expressed as Equation (4) in the frequency domain. When the values of the several subcarriers for a subchannel satisfying X(f,p)=0 are null for a given OFDM symbol p and some of the sets of the subcarriers f for a subchannel F, noise power is defined as Equation (4).

$$\sigma_v^2 \cong \frac{1}{N|F|} \sum_f |Y(f, p)|^2 \quad (4)$$

where the summation is performed over all subcarriers f, and |F| denotes a size of a subchannel.

An average of signal power transmitted in a base station to which the noise power calculated in accordance with Equation (3) and Equation (4) is given can be measured in the following way.

In the time domain where it is assumed that a signal is transmitted (there is a value of x(n,p) for all n and a given OFDM symbol p), an average of signal power is estimated by Equation (5).

$$\sigma_x^2 \cong \frac{1}{NM_t} \sum_n |y(n, p)|^2 - \sigma_v^2 \quad (5)$$

where the summation is performed over N samples.

Equation (5) can be expressed as Equation (6) in the frequency domain. When there is an X(f,p) value for a given OFDM symbol p and some sets of subcarriers f for a subchannel F, an average of signal power is defined as Equation (6).

$$\sigma_y^2 \cong \frac{1}{N|F|} \sum_f |Y(f, p)| - \sigma_v^2 \quad (6)$$

where the summation is performed over all subcarriers f, and |F| denotes a size of a subchannel.

A signal-to-noise pulse interference ratio can be calculated using the estimated noise power and signal power.

Some statistical features of channels can be estimated through the pilot information, and in this manner, it is possible to estimate the variance of the channels.

For a channel formed from a transmission antenna #k of a base station to a reception antenna #m of a mobile station, the channel feature in the time domain is estimated by Equation (7).

$$\sigma_{m,k}^2 \cong \frac{1}{P} \sum_p |[h(0, p)]_{m,k}|^2 \quad (7)$$

where $[h(0,p)]_{m,k}$ denotes a channel sample in an $m^{th}$ column and a $k^{th}$ row of h(0,0), and its average is calculated for P channel information pieces.

Equation (7) can be expressed as Equation (8) in the frequency domain.

$$\sigma_{m,k}^2 \cong \frac{1}{PF} \sum_{p,f} |[H(f, p)]_{m,k}|^2 \quad (8)$$

where the summation is performed over P OFDM symbols and F tones, i.e., F subcarriers.

In addition, a parameter that can be measured by the parameter measurer 22 includes a correlation feature. In particular, an average of transmission correlations indicates a correlation between two transmission antennas.

In the time domain, a correlation feature between a transmission antenna #k and a transmission antenna #m can be expressed as Equation (9).

$$\rho_{m,k}^2 \cong \frac{1}{PR} \sum_p \sum_r [h(0, p)]_{r,k} [h(0, p)]_{r,m}^* \quad (9)$$

Herein, the correlation feature is calculated as an average for R reception antennas and P correlation information pieces, and is averaged as many times as the total number of available multiple paths.

Equation (9) can be expressed as Equation (10) in the frequency domain.

$$\rho_{m,k}^2 \cong \frac{1}{PRF} \sum_f \sum_p \sum_r [h(f, p)]_{r,k} [h(f, p)]_{r,m}^* \quad (10)$$

where the summation is performed over P OFDM symbols, F tones, i.e. F subcarriers, and R reception antennas.

The correlation feature can be significantly affected depending on how the antennas of the base station are arranged, and as the arrangement basically fixed, the correlation feature may be pre determined. In this case, a base station may transmit the correlation feature information to a mobile station through a control signal, rather than the mobile station measuring the correlation feature.

The antenna reselect controller 24 determines whether to reselect transmission antennas in the following method. Because the present invention reselects transmission antennas of a base station according to channel performance as described above, it can be used for all of the cases where there is a change in the channel performance. In the following description, the present invention will be limited to a handoff situation which most directly shows the case where there is a change in the channel performance.

Figure 3:
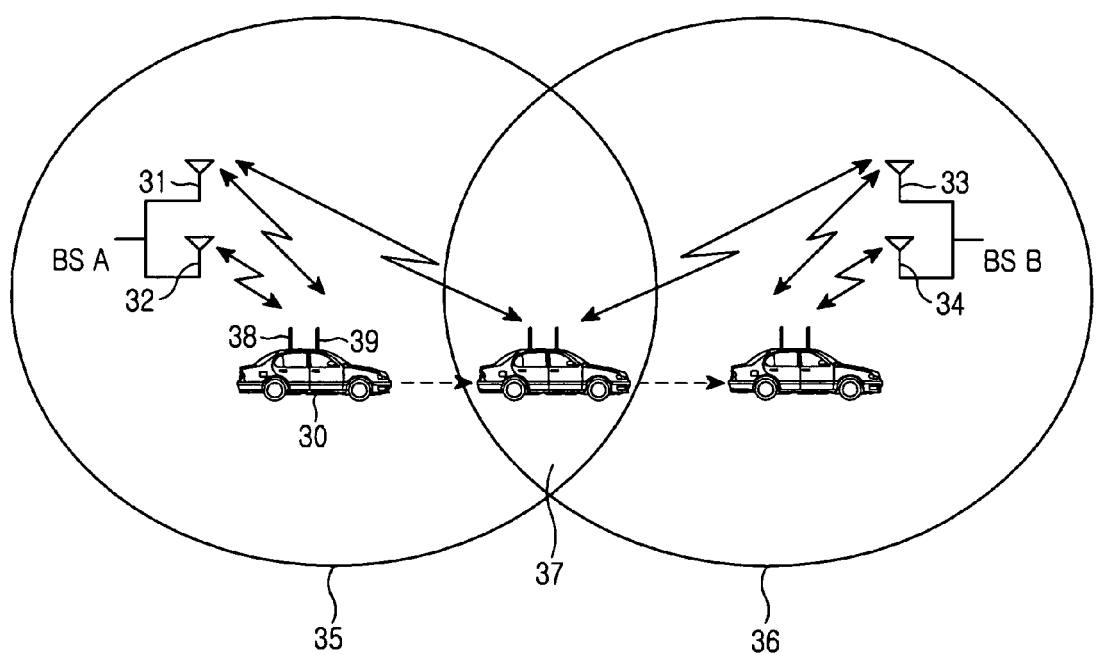
FIG. 3 is a diagram illustrating a basic concept of a handoff in a cellular mobile communication system using multiple antennas to which the present invention is applied.

With reference to FIG. 3, a description will now be made of a basic concept of a handoff in a cellular mobile communication system using multiple antennas to which the present invention is applied.

A mobile station 30 communicates with antennas 31 and 32 of a base station A using its antennas 38 and 39, in a cell 35. If the mobile station 30 moves toward a cell 36 and enters a handoff region 37 where the cell 35 and the cell 36 overlap each other, a transmission antenna reselecting process according to the present invention is performed. In FIG. 3, as a result of performing the transmission antenna reselecting process, the antenna 31 of the base station A and an antenna 33 of a base station B are selected as transmission antennas connected to the mobile station 30 in the handoff region 37. Therefore, the mobile station 30 is newly connected to the antenna 31 of the base station A and the antenna 33 of the base station B in the handoff region 37, and performs a handoff. Upon leaving the handoff region 37, the mobile station 30 is connected to the antennas 33 and 34 of the base station B by re-performing the transmission antenna reselecting process, and performs communication using the antennas 33 and 34.

In the cellular mobile communication system using multiple antennas, because a mobile station includes a plurality of antennas, a plurality of antennas of a mobile station can be connected to antennas of different base stations in a handoff region where cells overlap each other. Therefore, according to the present invention, a mobile station can perform communication seamlessly during a handoff.

However, the method for determining whether to reselect transmission antennas according to the present invention is not limited to the handoff situation, and it would be obvious to those skilled in the art that the restrictive method can be applied to all of the cases where there is a change in channel performance.

The antenna reselect controller 24 determines whether to reselect transmission antennas, using channel performance estimation information generated by the channel performance estimator 23. A description thereof will be made with reference to FIG. 4.

The channel performance estimation information used herein includes a signal strength indicator (SSI) and a channel correlation indicator (CCI). The SSI is an average value of signal powers, and the CCI is a random information value capable of representing a channel correlation feature calculated using the transmission correlation value. For example, the CCI can be defined as the maximum transmission correlation value, and is set to a value which is less than or equal to 1.

The SSI and the CCI are generated by the channel performance estimator 23 and delivered to the antenna reselect controller 24. More specifically, the channel performance estimator 23 delivers $SSI_h$, $SSI_t$, $CCI_h$, and $CCI_t$ values to the antenna reselect controller 24. $SSI_h$ is a signal strength value of a channel through which the mobile station is connected to the home base station, and $SSI_t$ is a signal strength value of a channel through which the mobile station is connected to a neighbor base station (or target base station). $CCI_h$ is a channel correlation value of a channel through which the mobile station is connected to the home base station, and $CCI_t$ is a channel correlation value of a channel through which the mobile station is connected to the neighbor base station.

The antenna reselect controller 24, receiving the $SSI_h$, $SSI_t$, $CCI_h$, and $CCI_t$ values, determines the threshold values $H_{in}^h$ and $H_{in}^t$ based on the $SSI_h$ and $CCI_h$, and determines threshold values $H_{out}^h$ and $H_{out}^t$ based on the $SSI_t$ and $CCI_t$, according to a lookup table. Herein, the threshold value $H_{in}^h$ is a threshold value for home base station's signal strength, with which the home base station determines that the mobile station moves in the handoff region as described in connection with FIG. 3, and the threshold value $H_{in}^t$ is a threshold value for a neighbor base station's signal strength, with which the neighbor base station determines that the mobile station moves in the handoff region. The threshold value $H_{out}^h$ is a threshold value for a home base station's signal strength, with which the home base station determines that the mobile station moves out from the handoff region as described in connection with FIG. 3, and the threshold value $H_{out}^t$ is a threshold value for a neighbor base station's signal strength, with which the neighbor base station determines that the mobile station moves out from the handoff region.

A method for calculating the threshold values will now be described in detail. A threshold value $H_{in}$, with which the home base station and the neighbor base station determine that the mobile station moves in the handoff region, and a threshold value $H_{out}$, with which the home base station and the neighbor base station determine that the mobile station moves out from the handoff region, are defined as Equation (11).

$$H_{in} = H_{in\_fixed} \cdot (1 - CCI \cdot \pi_1)$$

$$H_{out} = H_{out\_fixed} \cdot (1 - CCI \cdot \pi_2) \qquad (11)$$

wherein $\pi_1 > 1$, $\pi_2 > 1$, and the $\pi_1$ and $\pi_2$ are empirical constants used for determining the threshold values. $H_{in\_fixed}$ is a fixed signal strength value used for determining that a mobile station moves in a handoff region, and $H_{out\_fixed}$ is a fixed signal strength value used for determining that the mobile station moves out from the handoff region. This calculation can be equally applied to the home base station and the neighbor base station, or can be independently applied to the home base station and the neighbor base station.

Figure 4:
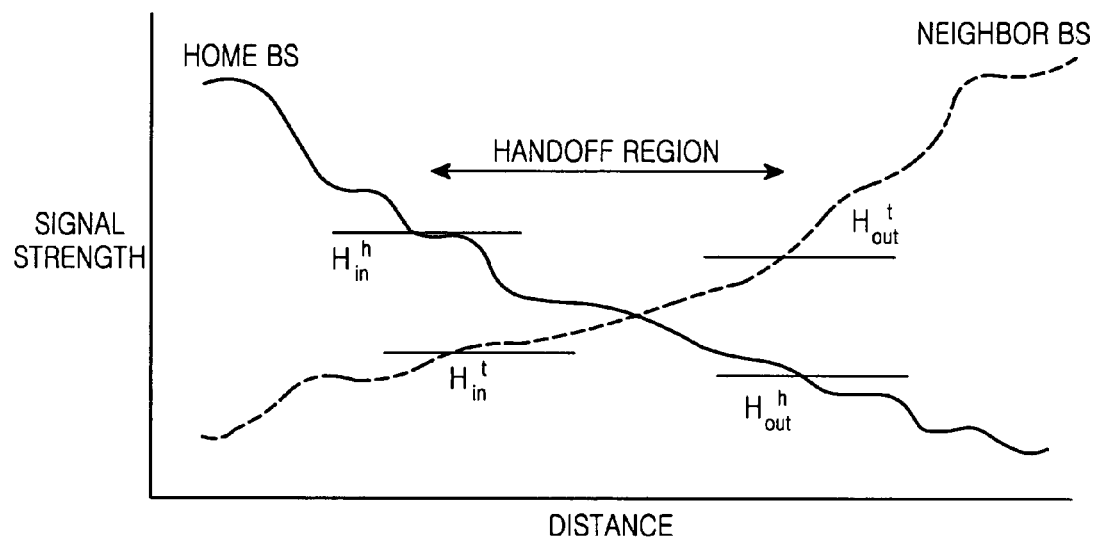
FIG. 4 is a diagram illustrating a method for determining whether to reselect antennas according to an embodiment of the present invention.

After receiving the $SSI_h$, $SSI_t$, $CCI_h$, and $CCI_t$ values and fully determining their corresponding threshold values, the antenna reselect controller 24 determines whether to reselect transmission antennas in the handoff region. Specifically, as illustrated in FIG. 4, if $SSI_t > H_{in}^t$ and $SSI_h < H_{in}^h$, the antenna reselect controller 24 determines that the mobile station is in a handoff state, determining that the mobile station has moved in the handoff region, and determines to perform a transmission antenna reselecting process according thereto. If $SSI_t > H_{out}^t$ and $SSI_h < H_{out}^h$, the antenna reselect controller 24 determines that the mobile station is not in a handoff state, determining that the mobile station has moved out from the handoff region, and determines to perform a transmission antenna reselecting process according thereto.

The method in which the antenna reselect controller 24 determines whether to reselect transmission antennas includes a method that uses the antenna configuration information between a mobile station and a base station as follows.

A description will now be made of another method for determining whether to reselect transmission antennas when a mobile station moves in a handoff region.

The antenna reselect controller 24 performs the measurement needed for an antenna reselecting process. Thereafter, the antenna reselect controller 24 calculates the channel performance information $L_{current}$ for the best antenna configuration between the home base station to which the mobile station is currently connected, and the mobile station. In addition, the antenna reselect controller 24 calculates a channel performance matrix $L_{target}(k)$ for all of the other antenna configurations related to the home base station and neighbor base stations, which can be connected to the mobile station in the handoff region, and the mobile station. As a result, if $\max_k L_{target}(k) > L_{current} + \delta$, the antenna reselect controller 24 determines that the mobile station is in the handoff state, and determines to reselect transmission antennas according thereto. Herein, $\delta$ is a threshold value indicating that a mobile station has moved into a handoff region. The measurement needed for the antenna reselecting process performed by the antenna reselect controller 24 is not separately performed by the antenna reselect controller 24 to substantially determine whether to reselect transmission antennas, but is merely provided to describe the method for determining whether to reselect transmission antennas on an overall basis. The measurement needed for the antenna reselecting process is substantially performed by the parameter measurer 22, and it is preferable that the antenna reselect controller 24 calculates $L_{current}$ and $L_{target}(k)$ using the channel quality parameter previously measured by the parameter measurer 22 only when it is necessary to determine whether to reselect transmission antennas.

Similarly, a description will now be made of a process of determining whether to reselect transmission antennas when the mobile station moves out from the handoff region.

The antenna reselect controller 24 performs the measurement needed for an antenna reselecting process. Thereafter, the antenna reselect controller 24 calculates a channel performance matrix $L_{current}(k)$ for the best antenna configuration between a mobile station and base stations in the current handoff region. In addition, the antenna reselect controller 24 calculates the channel performance information $L_{target}$ for the best antenna configuration between a mobile station and base stations outside the handoff region. As a result, if $L_{target} > \max_k L_{current}(k) + \delta$, the antenna reselect controller 24 determines that the mobile station is not in the handoff state, and determines to reselect transmission antennas according thereto. Herein, $\delta$ is a threshold value indicating that a mobile station has moved into a handoff region. Like in the case where the mobile station moves into the handoff region, the measurement needed for the antenna reselecting process performed by the antenna reselect controller 24 is not separately performed by the antenna reselect controller 24 to substantially determine whether to reselect transmission antennas, but is merely provided to describe the method for determining whether to reselect the transmission antennas on an overall basis. The measurement needed for the antenna reselecting process is substantially performed by the parameter measurer 22, and it is preferable that the antenna reselect controller 24 calculates $L_{current}(k)$ and $L_{target}$ using the channel quality parameter previously measured by the parameter measurer 22 only when it is necessary to determine whether to reselect transmission antennas.

In the method where the antenna reselect controller 24 determines whether to reselect transmission antennas using antenna configuration information between a mobile station and base stations, the antenna reselect controller 24 should calculate yields for all of the antenna configurations between the mobile station and the base stations when calculating the channel performance matrix $L_{current}(k)$ and the Lcurrent(k). However, in order to reduce the complexity needed for the calculation, a transmission antenna reselecting process described below is first performed to change an antenna configuration such that the calculation can be exclusively performed on the reselected transmission antennas.

Finally, a description will be made of a method in which the antenna reselect controller 24 reselects transmission antennas of base stations connected to a mobile station in a handoff region.

A transmission antenna reselecting process reselects optimal transmission antennas for sets of all of the available transmission antennas of the neighbor base stations as well as a home base station, to be connected to a plurality of antennas of a mobile station, in the case where it is necessary to change a channel due to a variation in the performance of a currently connected channel, including a handoff case.

Assume that a set of reselectable transmission antennas and base stations to which the reselectable transmission antennas belong is S. The antenna reselect controller 24 estimates the performance R(s) for each transmission antenna s in the set S, and selects a transmission antenna with $\max_{s \text{ in } S} R(s)$ as an optimal transmission antenna.

For example, when performance of a transmission antenna is estimated in an SNR, the antenna reselect controller 24 determines an SNR, $SNR_i[k]$, for a $k^{th}$ tone, i.e. $k^{th}$ subcarrier, and an $i^{th}$ data stream, for a given subset for a transmission antenna s in the S. In addition, the antenna reselect controller 24 selects the optimal transmission antennas in a ratio of an SNR for each antenna subset in the S. Herein, an average, a minimum ratio, or an outage ratio can be used for the ratio.

The most important factor in this transmission antenna reselecting process is the number of sets that should be searched as the optimal selection. Although the transmission antenna reselecting process selects a transmission antenna subset having the optimal performance from all of the possible transmission antenna subsets, the present invention is characterized by reducing the complexity of the transmission antenna reselecting process by reducing a size of the subset to be selected. For example, the antenna reselect controller 24 selects random transmission antenna subsets from among the transmission antenna subsets selectable in the handoff region. Alternatively, there is a method for defining the transmission antenna subsets to be used in the handoff region and for fixing a transmission antenna subset to be selected so that transmission antennas should be selected with only the corresponding subset. As another example, if a neighbor base station supports one data stream, the neighbor base station selects a predetermined transmission antenna or a random transmission antenna, and if a neighbor base station transmits a signal with two transmission antennas, it uses two transmission antennas having the least correlation. Such decorrelating subsets can be preset, thereby reducing the number of searchable subsets. The transmission antenna subset information can be pre stored in the storage 21, can be received from the base stations, or can be experimentally determined in the mobile station through measurements.

For example, a method for reducing the complexity of the transmission antenna reselecting process when selecting optimal transmission antennas from among the antennas of the base station A and the base station B in the handoff region described with reference to FIG. 3 can be divided into the following four methods. A first method searches for a set having the best yield from among all of the possible sets of the antennas of the base station A and the base station B. This method includes a case where only the antennas included in the base station A are selected, and/or another case where only the antennas included in the base station B are selected. In this method, the transmission antenna algorithm is most complex but has best performance. A second method unconditionally selects both of the antennas of the base station A and the antennas of the base station B, and then searches for an antenna set having the best yield. A third method unconditionally selects both of the antennas of the base station A and the antennas of the base station B, and then randomly selects one of the possible antenna sets. A fourth method unconditionally selects both of the antennas of the base station A and the antennas of the base station B, and previously fixes an antenna set to be used for a handoff.

A description will now be made of a cellular mobile communication system using multiple antennas to which the mobile station according to the first embodiment of the present invention is applied.

Figure 5:
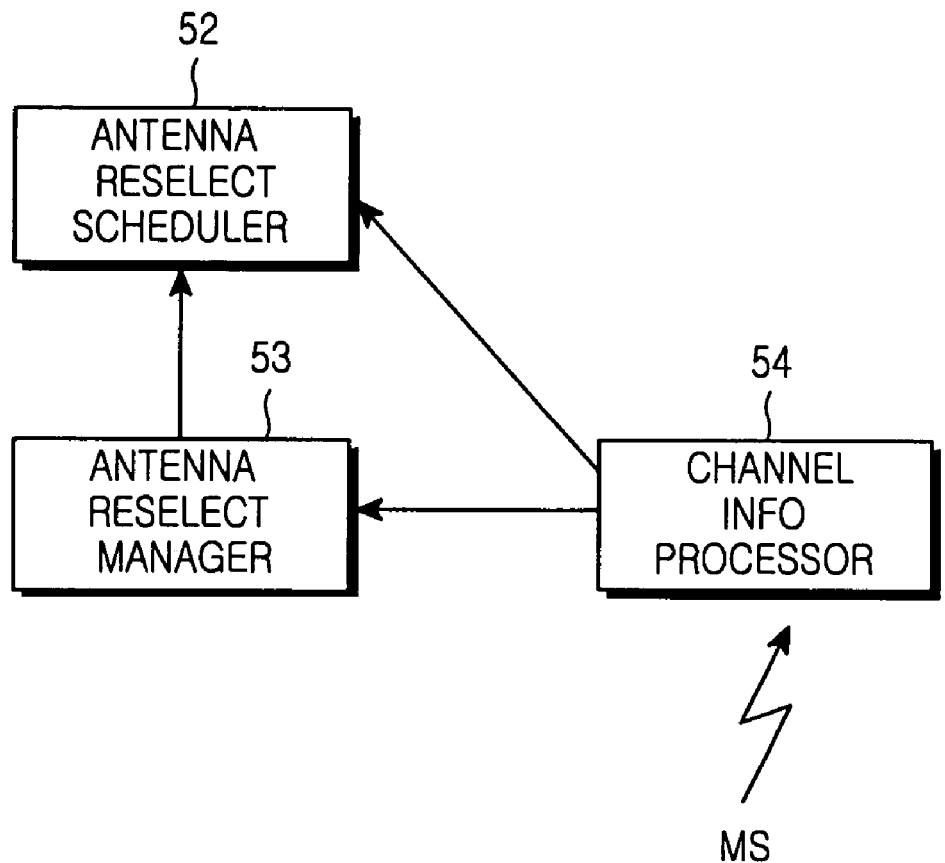
FIG. 5 is a diagram illustrating a structure of a base station according to the first embodiment of the present invention.

With reference to FIG. 5, a description will first be made of a base station corresponding to the mobile station according to the first embodiment.

As illustrated in FIG. 5, a base station includes an antenna reselect scheduler 52, an antenna reselect manager 53, and a channel information processor 54.

The channel information processor 54 determines if there is a change in channel quality such as an SNR average and data throughput for the channels, according to a measured channel quality parameter value received from the feedback signal generator 25 of the mobile station. The channel information processor 54 delivers information on the reselected transmission antennas and information on neighbor base stations including the reselected transmission antennas, received from the feedback signal generator 25 of the mobile station, to the antenna reselect manager 53. When the transmission antennas should be reselected, the channel information processor 54 delivers the information on the reselected transmission antennas to the antenna reselect scheduler 52.

The antenna reselect manager 53 transmits a transmission antenna reselect request to a neighbor base station based on the information provided from the channel information manager 54. In response, an antenna reselect scheduler 52 of the neighbor base station determines whether to approve the transmission antenna reselect request received from a home base station, and transmits the result to the home base station. A criterion for the determination includes the system traffic, a service quality request, the reselected antenna, etc.

When transmission antennas should be reselected, the antenna reselect scheduler 52 receives from the channel information processor 54 the information on the transmission antennas to be connected to the mobile station, and allocates corresponding transmission antennas to the mobile station.

Data from the antenna reselect manager 53 and the antenna reselect scheduler 52 undergoes Medium Access Control (MAC) processing, modulation, multiplexing, Inverse Fast Fourier Transform (IFFT) and guard interval insertion, before being transmitted.

Figure 6:
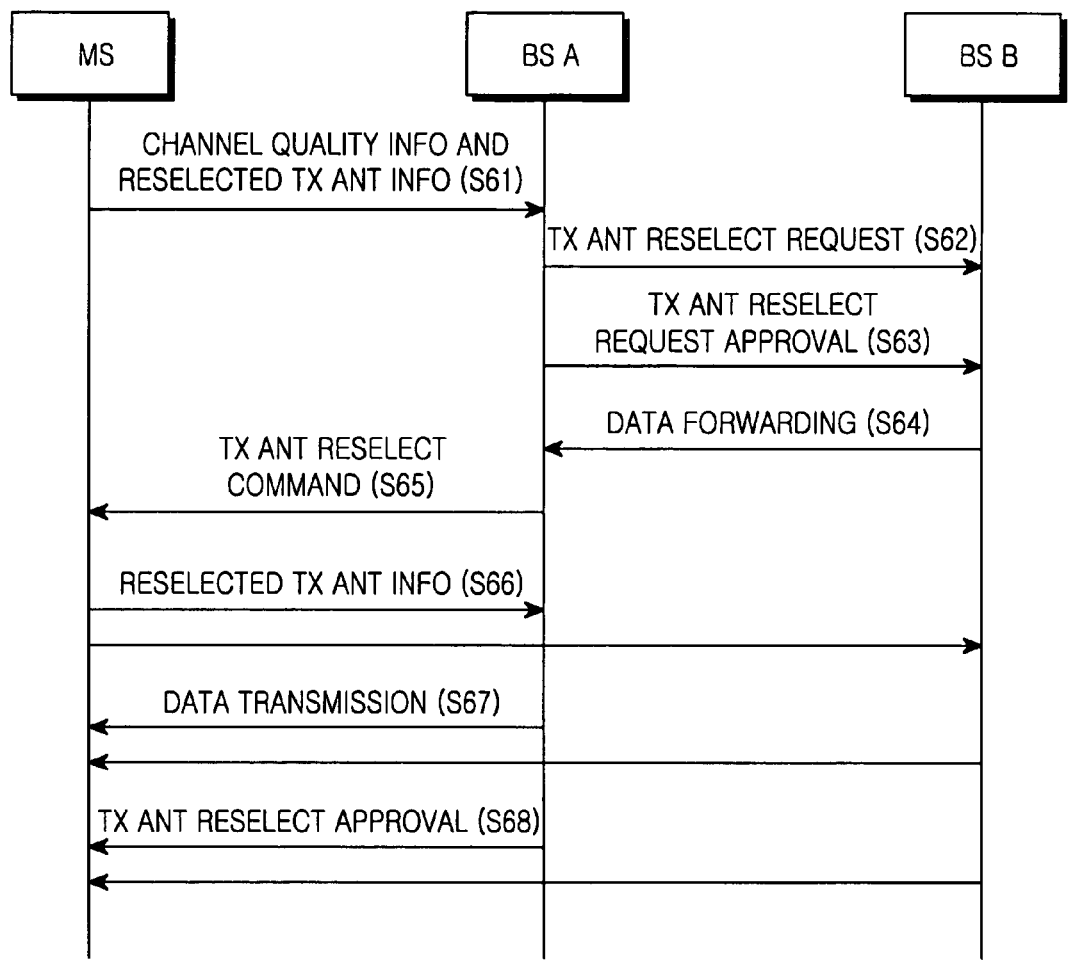
FIG. 6 is a signaling diagram illustrating a method for reselecting transmission antennas in a cellular mobile communication system using multiple antennas according to the first embodiment of the present invention.

With reference to FIG. 6, a description will now be made of a method for reselecting transmission antennas in a cellular mobile communication system using multiple antennas according to the first embodiment of the present invention. FIG. 6 is a signaling diagram illustrating a method for connecting two reception antennas of a mobile station 30 to reselected transmission antennas on the assumption that the transmission antennas reselected in the mobile station 30 including the two reception antennas include a transmission antenna of a base station A which is a home base station and a transmission antenna of a base station B which is a neighbor base station as illustrated in FIG. 3.

In step S61, the mobile station transmits a measured channel quality parameter value, the information on the reselected transmission antennas and the information on the neighbor base stations including the reselected transmission antennas to the base station A. Herein, because the reselected transmission antennas include a transmission antenna of the base station A which is a home base station and a transmission antenna of the base station B which is a neighbor base station, the information on neighbor base stations includes information on the base station A and the base station B.

In step S62, based on the information on reselected transmission antennas and the information on neighbor base stations including reselected transmission antennas, the base station A transmits a transmission antenna reselect request to the base station B.

In step S63, the base station B transmits to the base station A an approval message indicating an approval for the transmission antenna reselect request, if it can provide a service with the reselected transmission antenna.

In step S64, the base station A forwards data to the base station B upon receiving the approval message. The forwarded data includes the data that the mobile station should currently receive through a forward link. The reason for forwarding the data is because as connections between the mobile station and the reselected transmission antennas have not been completed yet, the other party in communication with the mobile station transmits the data only to the base station A. Thus, the base station A should forward the data to the base station B in order to enable the base station B to transmit the data to the mobile station.

In step S65, the base station A transmits a transmission antenna reselect command to the mobile station.

In step S66, the mobile station transmits to the base station A and the base station B information on the transmission antennas reselected through a transmission antenna reselecting process.

In step S67, the base station A and the base station B individually transmit data to the mobile station using the corresponding transmission antennas based on the information on the reselected transmission antennas. In step S68, the base station A transmits an approval message for transmission antenna reselection to the mobile station. Then the mobile station releases the connections to the transmission antennas to which current channels are formed, and forms new channels to the reselected transmission antennas. It is possible to enable parallel concurrent transmission by using a data channel in step S67 and a control channel in step S68.

The mobile station can continuously receive data from the base station A which is a home base station even while connecting with the reselected transmission antennas.

Second Embodiment

A second embodiment of the present invention provides a system and method in which a base station performs a process of reselecting the transmission antennas to be connected to a plurality of reception antennas of a mobile station. In particular, the second embodiment provides a system and method in which a home base station performs a transmission antenna reselecting process.

Figure 7:
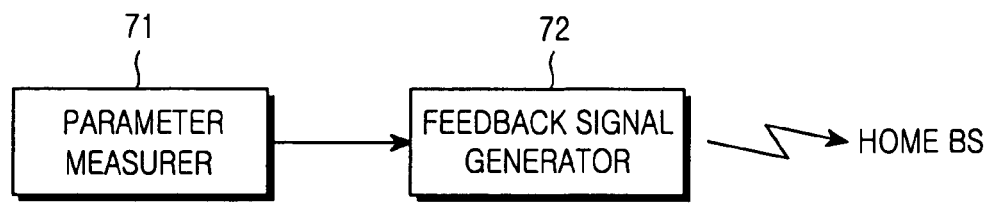
FIG. 7 is a diagram illustrating a structure of a mobile station according to a second embodiment of the present invention.

With reference to FIG. 7, a description will now be made of a structure of a mobile station according to the second embodiment of the present invention.

Referring to FIG. 7, a mobile station includes a parameter measurer 71 and a feedback signal generator 72.

The parameter measurer 71 measures a channel quality parameter, an index based used to estimate the performance of channels connected to the home base station and the neighbor base stations. It is preferable to periodically perform the measurement on the channel quality parameter. Alternatively, the measurement on the channel quality parameter can be performed upon certain occasions. For example, the measured channel quality parameter includes noise power, signal power, correlation feature, RSSI, C/I, SNR, and SIR. A detailed method for measuring the channel quality parameter by the parameter measurer 71 is to the same as the method for measuring the channel quality parameter by the parameter measurer 22 in the first embodiment, so a detailed description thereof will be omitted herein.

The feedback signal generator 72 quantizes the channel quality parameter measured by the parameter measurer 71, and transmits the quantization results to the home base station.

Figure 8:
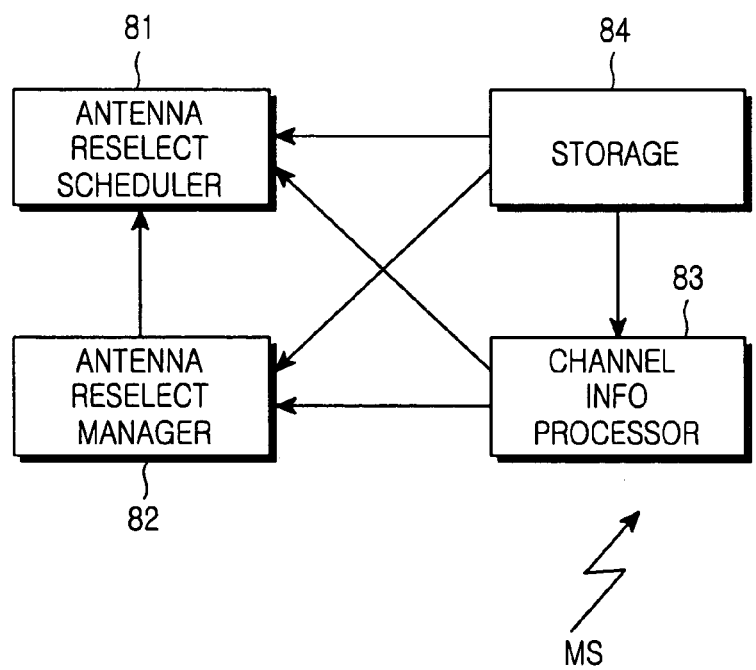
FIG. 8 is a diagram illustrating a structure of a base station according to the second embodiment of the present invention.

With reference to FIG. 8, a description will now be made of a base station that performs a transmission antenna reselecting process when there is a variation in channel performance due to movement of a mobile station in a cellular mobile communication system using multiple antennas according to the second embodiment of the present invention.

Referring to FIG. 8, a base station includes an antenna reselect scheduler 81, an antenna reselect manager 82, a channel information processor 83, and a storage 84.

The storage 84 stores a candidate list of the neighbor base stations. Because each base station is essentially fixed in its position, the storage 84 is apt to have information on the neighbor base stations, which is usually not changed. The candidate list of neighbor base stations include the IDs of the base stations, the number of transmission antennas provided by a corresponding base station, and the information on the transmission antennas which can be reselected according to the present invention.

Even in the second embodiment, the neighbor base stations include the home base station. For example, it is noted from FIG. 3 that the mobile station 30 communicates with a base station A, which is a home base station, and a base station B, which is a neighbor base station, in the handoff region 37. Even though the mobile station is located in the handoff region, all of the transmission antennas selected in a transmission antenna reselecting process can be either the transmission antennas of the home base station or the transmission antennas of the neighbor base stations according to channel performance.

The channel information processor 83 generates information based on which performance of respective channels can be estimated, using the measured channel quality parameter value received from the feedback signal generator 72 of the mobile station.

The antenna reselect manager 82 has a threshold value used to determined whether to reselect transmission antennas, for the channel performance estimation information generated by the channel information processor 83. Based on the threshold value, the antenna reselect manager 82 determines whether to reselect transmission antennas based on whether the channel performance estimation information is greater or less than the threshold value. A process of determining whether to reselect transmission antennas by the antenna reselect the manager 82 is that same as the process of determining whether to reselect transmission antennas by the antenna reselect controller 24 in the first embodiment, so a detailed description thereof will be omitted herein.

If it is determined that the transmission antennas should be reselected, the antenna reselect manager 82 transmits a transmission antenna reselect request to a neighbor base station by consulting the information stored in the storage 84. In response, an antenna reselect manager 82 of the neighbor base station determines whether to approve the transmission antenna reselect request received from a home base station, and transmits the result to the home base station. A criterion for the determination includes the system traffic, a service quality request, a reselected antenna, etc.

Upon receiving an approval for a handoff request from the neighbor base station, the antenna reselect manager 82 commands the antenna reselect scheduler 81 to reselect transmission antennas to be connected to the mobile station.

Then the antenna reselect scheduler 81 reselects the transmission antennas based on the channel performance estimation information generated by the channel information processor 83 and the candidate list of neighbor base stations. The antenna reselect scheduler 81 transmits to the corresponding neighbor base station the information on the reselected transmission antennas. A process of reselecting the transmission antennas by the antenna reselect scheduler 81 is to the same as the process of reselecting transmission antennas by the antenna reselect controller 24 in the first embodiment, so a detailed description thereof will be omitted herein.

In response, an antenna reselect scheduler 81 of the neighbor base station transmits an approval message to the home base station if it can provide a service with a corresponding transmission antenna indicated by the information on the selected transmission antennas, received from the home base station. Thereafter, the antennal reselect scheduler 81 of the neighbor base station allocates the corresponding transmission antenna to the mobile station and communicates with the mobile station using the allocated transmission antenna.

In the second embodiment of the present invention, the transmission antenna reselecting process is performed by the antenna reselect scheduler 81 of the base station and its preceding process of determining whether to reselect transmission antennas is performed by the antenna reselect manager 82 of the base station.

Data from the antenna reselect manager 82 and the antenna reselect scheduler 81 undergoes MAC processing, modulation, multiplexing, IFFT, and guard interval insertion, before being transmitted.

Figure 9:
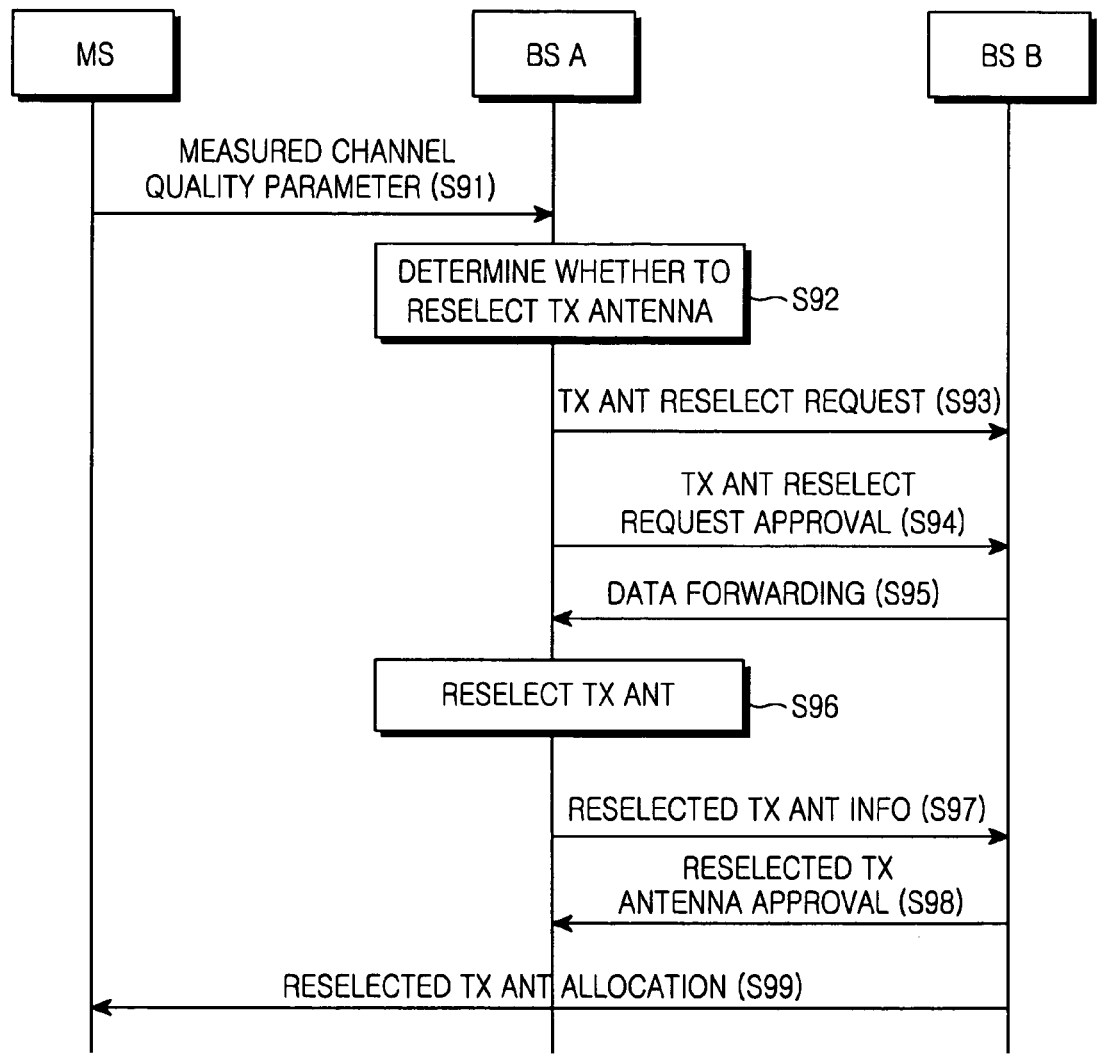
FIG. 9 is a signaling diagram illustrating a method for reselecting transmission antennas in a cellular mobile communication system using multiple antennas according to the second embodiment of the present invention.

With reference to FIG. 9, a description will now be made of a method for reselecting the transmission antennas in a cellular mobile communication system using multiple antennas according to the second embodiment of the present invention. FIG. 9 is a signaling diagram illustrating a method for connecting two reception antennas of a mobile station 30 to the reselected transmission antennas on the assumption that the reselected transmission antennas include a transmission antenna of a base station A, which is a home base station, and a transmission antenna of a base station B, which is a neighbor base station, as illustrated in FIG. 3.

In step S91, the mobile station transmits the measured channel quality parameter value to the base station A.

In step S92, the base station A determines whether to reselect transmission antennas through the antenna reselect manager 82. In step S93, if it is determined that the transmission antennas should be reselected, the base station A transmits a transmission antenna reselect request to the base station B including the reselected transmission antenna. At this point, because the base station A which is the home base station also includes the reselected transmission antenna, all of the commands, the information and the messages transmitted from the home base station to the base station B are processed in the home base station itself. Therefore, this operation will be omitted from the drawing. The operation is applied in the same way even in the following process.

In step S94, the base station B transmits an approval message indicating approval for the transmission antenna reselect request to the base station A, if it can provide a service with the reselected transmission antenna.

In step S95, upon receiving the approval message the base station A forwards data to the base station B. The forwarded data includes the data that the mobile station should currently receive through a forward link. The reason for forwarding the data is because as the connections between the mobile station and the reselected transmission antennas have not been completed yet, the other party in communication with the mobile station transmits the data only to the base station A. Thus, the base station A should forward the data to the base station B in order to enable the base station B to transmit the data to the mobile station.

The base station A performs a transmission antenna reselect process in step S96, and transmits to the base station B the information on the transmission antennas reselected through the transmission antenna reselect process in step S97.

Then the base station B transmits an approval message for the reselected transmission antennas in step S98, and allocates the corresponding transmission antennas to the mobile station in step S99. Then the mobile station releases connections to the transmission antennas to which current channels are formed, and forms new channels to the reselected transmission antennas.

The transmission antennas reselected in step S96 include an antenna of the base station A which is a home base station. The base station A processes the information on the reselected transmission antennas to be connected to the mobile station by itself in step S97, and also performs approval processing on the reselected transmission antennas by itself in step S98.

The mobile station can continuously receive data from the base station A which is a home base station even while connecting with the reselected transmission antennas.

As described above, the present invention reselects a plurality of antennas of the base stations connected to a mobile station according to channel performance in a cellular mobile communication system using multiple antennas, thereby maintaining the optimal channel state and thus providing high-quality multimedia service.

In addition, the present invention separates the transmission antennas as far as possible using a plurality of antennas, thereby reducing the correlation between the transmission antennas. The reduction in the antenna correlation that considerably affects performance of a multiantenna system and a reduction in the spatial correlation effect contribute to an increase in system capacity, link throughput, and other performances.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for reselecting an antenna for a data channel by a mobile station in a cellular mobile communication system that includes the mobile station having at least two antennas, a home base station having a plurality of antennas, at least one of which is used to form the data channel to the mobile station, and at least one neighbor base station of the home base station, the method comprising the steps of:
   determining whether to reselect antennas based on channel qualities of first antennas of the home base station and second antennas of the neighbor base station; and
   selecting at least two antennas from among the first antennas and the second antennas based on the channel qualities;
   wherein the mobile station transmits the measured channel qualities to the home base station, and performs the antenna selecting step in response to a command from the home base station.

2. The method of claim 1, wherein the step of determining whether to reselect antennas comprises the step of comparing a channel quality for an antenna to which the current channel is formed with a threshold value for a channel quality.

3. The method of claim 1, wherein the step of determining whether to reselect antennas comprises the step of comparing a channel quality for an antenna to which the current channel is formed with channel qualities for all possible antenna configurations for the first antennas and the second antennas.

4. The method of claim 1, further comprising the step of transmitting information related to the selected at least two antennas to the home base station.

5. The method of claim 4, wherein upon receiving an approval for use of the selected at least two antennas from the home base station, the mobile station after transmitting the information, releases connections to antennas through which current data channels are formed, and forms new data channels through the selected at least two antennas.

6. The method of claim 1, wherein the channel quality includes at least one of a noise power, a signal power, a correlation feature, a Received Signal Strength Indicator (RSSI), a Carrier-to-Interference ratio (C/I), a Signal-to-Noise Ratio (SNR), and a Signal-to-Interference Noise Ratio (SINR).

7. A system for reselecting an antenna for a data channel by a mobile station in a cellular mobile communication system that includes the mobile station having at least two antennas, a home base station having a plurality of antennas, at least one of which is used to form the data channel to the mobile station, and at least one neighbor base station for the home base station, the system comprising:
   a mobile station for determining whether to reselect antennas based on channel qualities for first antennas of the home base station and second antennas of the neighbor base station, selecting at least two antennas from among the first antennas and the second antennas based on the measured channel qualities, and transmitting information on the selected at least two antennas to the home base station; and
   a home base station for receiving information on the measured channel qualities and transmitting a command for selection of at least the two antennas to the mobile station according to the received information.

8. The system of claim 7, wherein the mobile station comprises:
   a storage for storing information on the home base station and the first antennas, and information on the neighbor base station and the second antennas;
   a parameter measurer for measuring the channel qualities based on the information stored in the storage;
   a channel performance estimator for generating performance of the first and second antennas using the channel qualities;
   an antenna reselect controller for determining whether to reselect the antennas, and selecting the at least two antennas in response to an antenna select command form the home base station; and
   a feedback signal generator for transmitting to the home base station the measured channel qualities and information on the selected at least two antennas.

9. The system of claim 8, wherein the antenna reselect controller defines a threshold value for the channel quality, compares a channel quality, for an antenna to which a current channel is formed, with the threshold value, and determines whether to reselect the antennas based on the comparison result.

10. The system of claim 8, wherein the antenna reselect controller compares a channel quality for an antenna to which a current channel is formed, with channel qualities for all possible antenna configurations for the first antennas and the second antennas, and determines whether to reselect the antennas according to the comparison result.

11. The system of claim 7, wherein the home base station comprises:
- a channel information processor for receiving the measured channel qualities and information on the selected at least two antennas;
- an antenna reselect manager for transmitting a command for the selection of the at least two antennas to the mobile station according to the measured channel qualities; and
- an antenna reselect scheduler for allocating the selected at least two antennas to the mobile station.

12. The system of claim 11, wherein if the at least two antennas include the second antennas, the antenna reselect manager transmits corresponding information to the neighbor base station.

13. The system of claim 7, wherein the channel quality includes at least one of a noise power, a signal power, a correlation feature, a Received Signal Strength Indicator (RSSI), a Carrier-to-Interference ratio (C/I), a Signal-to-Noise Ratio (SNR), and a Signal-to-Interference Noise Ratio (SINR).

14. The system of claim 7, wherein upon receiving an approval for use of the selected at least two antennas from the home base station, the mobile station releases connections to antennas through which current data channels are formed, and forms new data channels through the selected at least two antennas.

* * * * *